United States Patent [19]

Cagle et al.

[11] 3,867,552

[45] Feb. 18, 1975

[54] PROCESS OF PREPARING POULTRY FOOD PRODUCT

[75] Inventors: James Douglas Cagle, East Point; Roger C. Stein, Lovejoy, both of Ga.

[73] Assignee: Cagle's Inc., Atlanta, Ga.

[22] Filed: July 30, 1973

[21] Appl. No.: 383,663

Related U.S. Application Data

[63] Continuation-in-part of Ser. No. 149,832, June 3, 1971, abandoned.

[52] U.S. Cl.................... 426/27, 426/275, 426/283, 426/344, 426/371, 426/487, 426/513
[51] Int. Cl............................................ A22c 21/00
[58] Field of Search ............ 426/27, 138, 212, 283, 426/332, 344, 371, 478, 509, 382, 412, 487, 275, 513

[56] References Cited
UNITED STATES PATENTS 3,547,656    12/1970    Schlamb .............................. 426/382
3,666,490    5/1972    Whittingham .................. 426/478 X

OTHER PUBLICATIONS

Lord, "Everybody's Cookbook," 1924, published by Harcourt, Brace & Co., N.Y., pgs. 626, 627, article entitled Chicken Pie.

Berolzheimer, "Culinary Arts Institute Encyclopedic Cookbook," 1949, published by Culinary Arts Institute, Chicago, pg. 427, Chicken Turnovers, and pg. 441, Turkey Pie.

*Primary Examiner*—Hyman Lord
*Attorney, Agent, or Firm*—Newton, Hopkins & Ormsby

[57] ABSTRACT

A poultry food product and a method of preparing the same including the steps of forming a slurry of deboned poultry meat, seasoning same, cooking said slurried meat, chilling said cooked meat, encasing said cooked meat in a dough, and cooking said meat filled dough.

1 Claim, No Drawings

PROCESS OF PREPARING POULTRY FOOD PRODUCT

CROSS REFERENCE TO RELATED APPLICATION

This is a continuation-in-part of our application Ser. No. 149,832, filed June 3, 1971, entitled "Poultry Food Product and Method of Preparing Same", now abandoned.

BACKGROUND OF THE INVENTION

This invention relates to a poultry food product and more particularly to a chicken pie and a method of preparing the same.

Very little has been done in the past to utilize the small amounts of meat which cling to the bones of poultry products as they are processed. This is especially true in the case of chickens.

Recently, means have been developed to remove these small amounts of meat for further utilization. This deboning procedure has made available a new source of poultry meat which is rich in essential protein. Normally this would be wasted. Through a pressing process, a yield of about 55 percent % is realized of edible product.

SUMMARY OF THE INVENTION

Briefly described, the present invention provides a poultry food product and a method of preparing the same, comprising an emulsified, deboned poultry meat filler that has been cooked and is wrapped in a dough shell for subsequent cooking in a suitable heat medium.

It is, therefore, a primary object of this invention to provide a poultry food product and a method of preparing the same which employs an emulsified deboned poultry meat filler.

Another object of this invention is to provide a poultry food product which is easy to prepare, low in cost, nutritious, and pleasing in appearance and appetizing in taste.

Still other objects and advantages of the present invention will become apparent in the light of the following selected illustrative embodiment of the invention.

DESCRIPTION OF THE INVENTION

This invention is carried out by first obtaining deboned poultry meat which is prepared by any suitable commercial means. The term "poultry" includes turkeys, chickens, ducks, geese and the like. The invention applies to the white or dark meat of poultry, as well as mixtures thereof. The kidneys and sex glands of the poultry are removed before the meat is deboned in accordance with federal regulations. This deboned meat is usually packaged in frozen form.

The frozen meat is placed in a cutter means which cuts the meat into fine pieces. The pieces are conveyed to a chopping and mixing apparatus wherein the meat is further ground up. A binder material, such as 3 ½ percent soya flour or 3 ½ percent milk powder, is added to the comminuted poultry meat. The binder material has an adhesive effect and binds the pieces of meat together in a cohesive mass so that the meat when cooked has the appearance and behavior of a unitary product. Suitable seasoning is added and thoroughly mixed with the meat to form a slurry. Any suitable seasoning can be employed. The slurry is passed through de-aerification equipment to remove any air bubbles trapped in the mixture. This de-aerification process is done by vacuum and gives the product more substance or body.

The emulsified mixture is then placed in the mold of a conventional type sausage stuffing machine and stuffed into an artificial casing for easy handling. This casing is the usual meat wrapper found on such items as bologna and weiners and can be automatically fabricated by any commercially available means. The size and shape of the casing are variable in order to employ any desirable shape or quantity of filler material. Preferably, the shape of the casing is tubular.

The encased meat filler is next cooked in a vat until it reaches 160° internal temperature. The cooking medium is a water bath in which the filler is submerged. The casing prevents the meat from absorbing any of the water. The meat is removed from the cooking vat and then is cooled or chilled in a cold water bath until an internal temperature of 80°F. is reached. The heating and cooling means can be either dry or moist mediums, preferably moist, such as water.

Next, the meat is sliced and cut into the shape that it is desired that the ultimate poultry product should assume. The shape can be a half-moon, a rectangle, a square of if the casing is circular, the meat can be left uncut so that the product will assume a round shape. The width of each slice, regardless of its shape should be, for convenience of the consumer, one inch or less. Any thicker slice would tend to be heavy when it is held in its final form.

The filler is then encased in a wrapper of any good commercial yeast-rising pie dough which provides a light, relatively thick shell for the slurried meat. The open edges of the dough shell are pinched or crimped together to make a complete closure. A heated cooking medium, preferably liquid, such as oil or grease, is then employed to fry the meat filled dough or pie. For an even cooking result in the liquid medium, the pie is completely submerged in the medium disposed in a container which is heated by any suitable means. Upon contacting the hot cooking medium, the exterior of the dough or shell is quickly cooked and forms a hard or rigid golden brown crust which prevents undesirable absorption of cooking medium by the filler. To ensure submersion of the pie during the cooking sequence, it can be placed between perforated cooking racks and placed on the bottom of the cooking container. After the dough is cooked, the pie is removed from the cooking medium and chilled. The fried pie can then be placed in a commercial wax wrapper and sold. Also the cooked product may be frozen to preserve same for future consumption.

ILLUSTRATIVE EXAMPLE

A specific example illustrative of the invention is as follows: 90 pounds of deboned chicken meat was cut and chopped into fine pieces. 10 pounds of water, 3 pounds of salt, 3.5 pounds of soya protein binder and 0.8 ounces of B.W.D. spice were added to the meat, and the resultant mixture was slurried.

The B.W.D. spice is comprised of salt, monosodium glutamate (21.9%), hydrolyzed plant protein (9.3%), pepper, tumeric, other spices and flavorings, onion powder, garlic powder, and dextrose.

The slurried meat was then de-aerified and pumped into a round artificial casing.

The meat was then submerged in a hot water bath which was maintained at a temperature in the range of 180°F. for 4 – 4 ½ hours until the internal temperature of the slurried chicken reached a temperature in the range of 165°F. The meat was removed from its heating bath and placed in a cool water bath until the internal temperature of the slurried meat was lowered to a temperature in the range of 110°F. The meat was taken from the cool water bath and the artificial casing was then removed from the meat. The meat filler was cut into three-quarter inch slices and each slice was then halved. The resultant moon-shaped filler was covered in a dough shell. The open ends of the shell were crimped or pinched together to seal the filler in the dough casing.

The pies were positioned between perforated cooking racks and deep fried in oil maintained at a temperature in the range of 375°F. Under usual conditions, the pie at that temperature will be cooked in approximately 2 minutes. The pies were then removed from the cooking medium and drained to remove any remaining oil. The pies are then either chilled or frozen, depending on whether the pie is placed in a wrapper for immediate sale or stored for further commercial processing.

It is obvious that one skilled in the art may make modifications in the details of the method and product disclosed in the present invention without departing from the spirit of the invention which is set out in varying scope in the appended claims.

What is claimed is:

1. A process of using poultry meat comprising the steps of:
   a. removing meat which clings to the bones of poultry;
   b. comminuting said removed meat;
   c. adding predetermined amounts of seasoning and binder to said meat to form a mixture;
   d. adding a predetermined amount of water to said mixture to form a slurry;
   e. deaerating said slurry to remove entrapped air bubbles from the slurry;
   f. placing said slurry in an artificial sausage-type casing;
   g. raising the temperature of the encased slurry to cook the slurry;
   h. chilling said cooked product to an internal temperature of approximately 80°F.;
   i. removing said cooked product from the casing;
   j. slicing the cooked product to a desired size
   k. encasing the sliced cooked product in a shell of yeast-rising pie dough; and
   l. cooking said dough encased product for a predetermined period at a predetermined temperature.

* * * * *